No. 893,857.
PATENTED JULY 21, 1908.
G. A. LUTZ & C. C. SIBLEY.
FLEXIBLE CONDUIT.
APPLICATION FILED APR. 3, 1906.
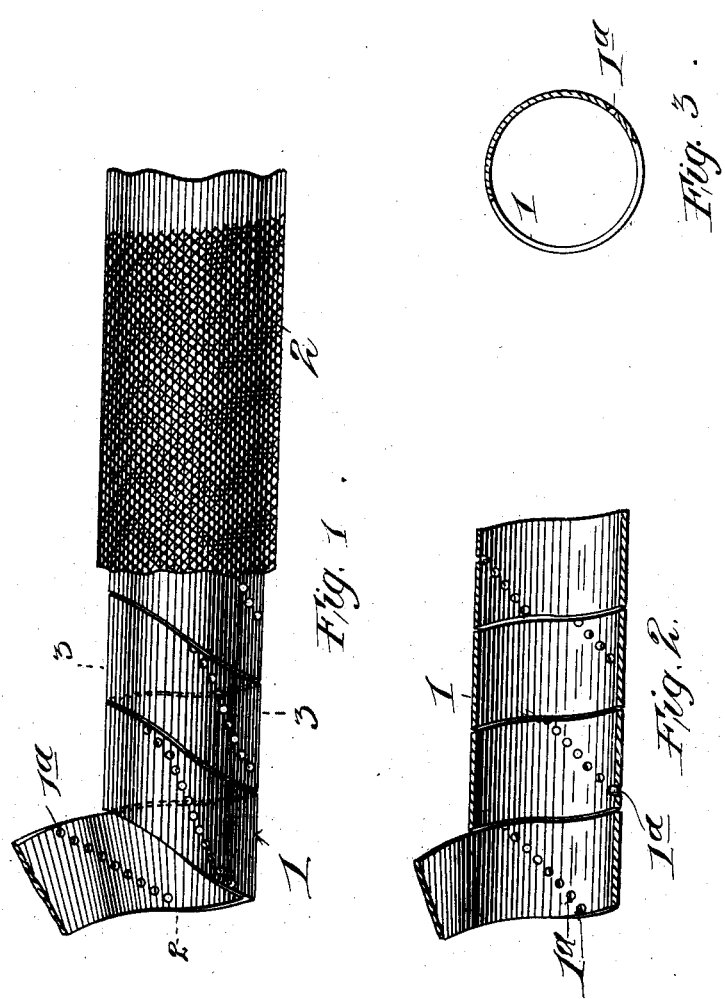
Witnesses
Inventors
Geo. A. Lutz & C. C. Sibley
By Attorney
T. F. Bourne

UNITED STATES PATENT OFFICE.

GEORGE A. LUTZ, OF NEW YORK, N. Y., AND CLARENCE C. SIBLEY, OF PERTH AMBOY, NEW JERSEY, ASSIGNORS TO AMERICAN CIRCULAR LOOM COMPANY, OF PORTLAND, MAINE, A CORPORATION OF MAINE.

FLEXIBLE CONDUIT.

No. 893,857.  Specification of Letters Patent.  Patented July 21, 1908.

Application filed April 3, 1906. Serial No. 309,605.

*To all whom it may concern:*

Be it known that we, GEORGE A. LUTZ and CLARENCE C. SIBLEY, residing, respectively, in New York city, borough of Brooklyn, New York, and Perth Amboy, Middlesex county, New Jersey, have invented certain new and useful Improvements in Flexible Conduits, of which the following is a specification.

The object of this invention is to provide improved means for weakening the lining within the covering, to the end that the inner and outer surfaces of the lining will be relatively smooth, the lining having proper strength for permitting it to be wound upon a mandrel if the lining is weakened before being wound, and whereby if an attempt be made to pull the lining from the outer covering the lining will tear and prevent but a small portion from being so removed from the conduit.

In accordance with our invention we provide a conduit with a lining and perforate the lining, preferably by rows of holes extending across the lining at distances apart, so that if the lining is pulled near one end of the conduit the lining will tear along the perforations while the main part will remain in the cover.

Reference is to be had to the accompanying drawings, forming part hereof, wherein, Figure 1 is a side view of a conduit embodying our invention, part of the cover being removed, Fig. 2 is a central section of the lining, on the line 2 in Fig. 1, Fig. 3 is a cross section substantially on the line indicated at 3, 3 in Fig. 1.

In the accompanying drawings, in which similar numerals indicate like parts in the several views, the numeral 1 indicates a lining, shown in the form of a spirally wound strip, which may be of paper or other suitable insulating material, and at 2 is a cover which may be braided, wound or otherwise applied over the lining, and which may be rendered fireproof or waterproof in any well known manner.

The strip of paper or other insulating material from which the tube or lining 1 is made is provided with perforations $1^a$, which preferably extend in series or rows at suitable distances apart, whereby the lining or strip is weakened at various places. By preference, and as shown in the drawings, the rows of perforations $1^a$ in the lining extend at an angle to the longitudinal axis of the completed inner tube. By weakening the walls of the inner tube or lining by means of perforations, the inner surface of the tube or lining is left substantially smooth so that a conductor being drawn through the same will not be liable to injure the tube at the perforations, and likewise the outer surface of the tube or lining is substantially smooth at the perforations so as not to interfere with the proper braiding or other application of the cover 2 thereon.

By means of the improvements above described a flexible conduit is provided which may be used in well known manner for receiving electric conductors, but if an attempt be made to pull the inner tube or lining 1 from the covering 2, the tube or lining will tear along one or more of the rows or perforations, near the end of the cover, thereby preventing more than a small portion of the lining from being pulled from the covering.

Having now described our invention what we claim is:—

1. A conduit comprising a covering, and a lining having series of rows of perforations at distances apart, said rows of perforations extending at an angle to the longitudinal axis of the conduit.

2. A conduit for electric wires comprising a covering, and a spirally wound strip of insulating material provided with series of rows of perforations at distances apart, said rows of perforations extending at an angle to the longitudinal axis of the conduit.

GEO. A. LUTZ.
CLARENCE C. SIBLEY.

Witnesses:
T. F. BOURNE,
L. SWINTON.